United States Patent [19]

Nagaoka

[11] Patent Number: 5,069,279

[45] Date of Patent: Dec. 3, 1991

[54] WELL STRUCTURE HAVING A SCREEN ELEMENT WITH WIRE SUPPORTING RODS

[75] Inventor: Tadayoshi Nagaoka, Mihara, Japan

[73] Assignee: Nagaoka Kanaami Kabushiki Kaisha, Osaka, Japan

[21] Appl. No.: 548,103

[22] Filed: Jul. 5, 1990

[51] Int. Cl.$^5$ .............................................. E21B 43/08
[52] U.S. Cl. .................................. 166/234; 166/235; 210/488; 210/497.01
[58] Field of Search ............... 166/234, 235, 232, 231, 166/227, 230, 205, 157; 210/488, 497.01

[56] References Cited

U.S. PATENT DOCUMENTS

| | | | |
|---|---|---|---|
| 478,061 | 6/1892 | King | 166/234 |
| 725,117 | 4/1903 | Morris | 166/235 X |
| 805,211 | 11/1905 | Layne | 166/232 |
| 1,031,596 | 7/1912 | Terrill | 166/205 |
| 1,682,697 | 8/1928 | Thorpe et al. | 166/234 |
| 4,657,079 | 4/1987 | Nagaoka | 166/231 |
| 4,770,336 | 9/1988 | Arterbury et al. | 166/235 X |
| 4,818,403 | 4/1989 | Nagaoka | 210/488 |

*Primary Examiner*—Hoang C. Dang
*Attorney, Agent, or Firm*—Hedman, Gibson, Costigan & Hoare

[57] ABSTRACT

A well structure suitable for use as a shallow well having a large diameter includes a well curb, and one or more water intake segments mounted in a part of the well curb. Each water intake segments includes a frame made of a vertically arranged pair of flanges extending in the circumferential direction and a laterally arranged pair of flanges extending in the axial direction, the frame having a form which constitute a part of a cylinder, a screen element such as wires and wire supporting rods secured to the frame, and one or more reinforcing members secured at ends thereof to either of the vertically arranged pair of flanges or the laterally arranged pair of flanges for reinforcing the frame.

2 Claims, 5 Drawing Sheets

WELL STRUCTURE HAVING A SCREEN ELEMENT WITH WIRE SUPPORTING RODS

BACKGROUND OF THE INVENTION

This invention relates to a well structure and, more particularly, to a well structure suitable for use as a relatively shallow well of a large diameter.

A shallow well which reaches a shallow underground layer where water is gathered but not down to a deeper layer which is impervious to water is constructed in such a manner that, as shown in FIG. 7, a well curb 1 made of concrete is buried under the ground 2 and macadam 3 is laid under the well curb 1. Holes constituting a water intake 5 are formed in a portion of the well curb 1 corresponding in position to a layer 4 where water is gathered whereby underground water is taken into the well curb 1 through the water intake 5 and also through the macadam 3.

In such a conventional shallow well, if the water intake 5 is made large with a view to improving water collecting efficiency, sand tends to flow into the well curb 1 and, besides, the strength of the well curb 1 decreases with resulting occurrence of buckling or deformation by pressure of earth. Conversely, if the strength of the well curb 1 is to be sufficiently large to prevent occurrence of such buckling or deformation, the number of holes constituting the water intake 5 must be restricted which will result in decrease in the water collecting efficiency and increase in the flow speed of water collected into the well curb 1 which results in increase of sand taken into the well curb 1. Moreover, the well curb 1 is generally set in position by suspending it from above and lowering it in a pit formed in the ground. If the well curb 1 is inclined even slightly when it has been set in position, a large pressure is applied to the well curb 1 so that the well curb 1 must be designed to withstand such pressure.

U.S. Pat. No. 4,657,079 discloses a deep well screen which can resist a large pressure applied from outside. This screen however is not suitable for use as a shallow well screen using the well curb 1 made of concrete because the weight of the well curb 1 is so large that the well screen disclosed in the above mentioned U.S. patent has not sufficient strength to support the weight of the well curb 1 and it will therefore collapse in the axial direction of the screen. Moreover, in a case where the diameter of the well is large, the area of the surface of the well to which pressure of earth is applied is so large that the structure of the deep well screen will not be strong enough for resisting such pressure of earth. It is also very difficult to manufacture such a screen of a large diameter and convey it to the location of the well and assemble it with the concrete well curb 1.

It is, therefore, an object of the invention to provide a well structure suitable for use as a shallow well of a large diameter which has a sufficient strength, is convenient for conveying and assembling, and moreover has an excellent water collecting efficiency.

SUMMARY OF THE INVENTION

The well structure achieving the above described object of the invention comprises a well curb, and one or more water intake segments mounted in a part of the well curb comprising a frame made of a vertically arranged pair of flanges extending in the circumferential direction and a laterally arranged pair of flanges extending in the axial direction, said frame having a form which constitute a part of a cylinder, a screen element secured to the frame, and one or more reinforcing members secured at ends thereof to either of the vertically arranged pair of flanges or the laterally arranged pair of flanges for reinforcing the frame.

According to the invention, the water intake segments comprise a frame made of flanges arranged in the axial and circumferential directions in a form constituting a part of a well curb, a reinforcing member for reinforcing the frame and a screen element secured to the frame. These water intake segments are connected to one another in one or more stages to form a cylinder and inserted between a two-piece well curb to form a water intake portion or, alternatively, one or more of these segments are mounted to one or more window portions of a well curb to form a water intake portion.

Benefits derived from the well structure according to the invention are as follows:

(1) Since the water intake portion is made of the segments comprising the frame made of the connecting flanges and reinforced with the reinforcing member and the screen element, a large water collecting area can be obtained and a sufficient buckling strength and strength against earth pressure can be obtained.

(2) Since the water intake segments are used for collecting water, a large opening rate of the water intake portion can be obtained by the employment of a wire screen whereby the water collecting efficiency can be improved and the flow speed of water taken into the well curb can be held at a sufficiently low speed for preventing flowing of sand into the well curb.

(3) Since the water intake segments are used, they can be readily conveyed to a location where a well is to be built and these segments can be easily assembled into the water intake section of a well structure.

(4) If one of the water intake segments is damaged, it can be replaced readily by another segment without replacing the entire water intake portion so that the life of the well can be prolonged.

Preferred embodiments of the invention will now be described with reference to the accompanying drawings.

BRIEF DESCRIPTION OF THE DRAWINGS

In the accompanying drawings,

FIGS. 1 to 4 are views showing an embodiment of the well structure according to the invention in which FIG. 1 is a perspective view of a water intake portion, FIG. 2 is a partial perspective view of a water intake segment, FIG. 3 is a perspective view of the entire well structure and FIG. 4 is a side view of the entire well structure in a buried state, partially in section;

FIGS. 5 and 6 are views showing another embodiment of the invention in which FIG. 5 is a perspective view of the entire well structure and FIG. 6 is a side view of the entire well structure in a buried state, partially in section.

DESCRIPTION OF PREFERRED EMBODIMENTS

Figure 1:
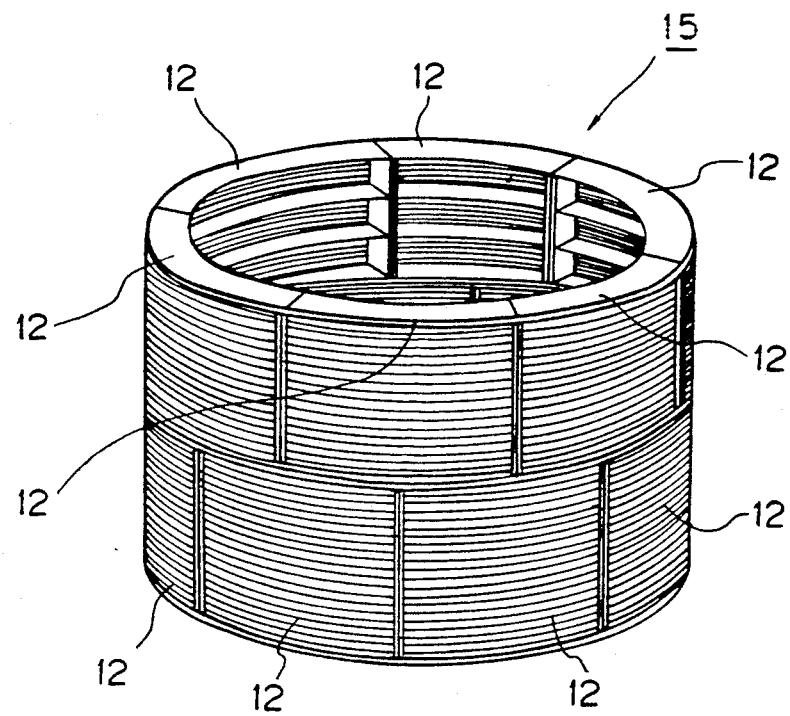

Referring to FIGS. 1 through 4, an embodiment of the invention will be described.

In this well structure 10, a plurality of water intake segments 12 which are connected together to form a cylindrical water intake portion 15 are disposed between an upper well curb 11a and a lower well curb 11b of a well curb 11 which constitutes a relatively shallow well having a relatively large diameter.

Figure 2:
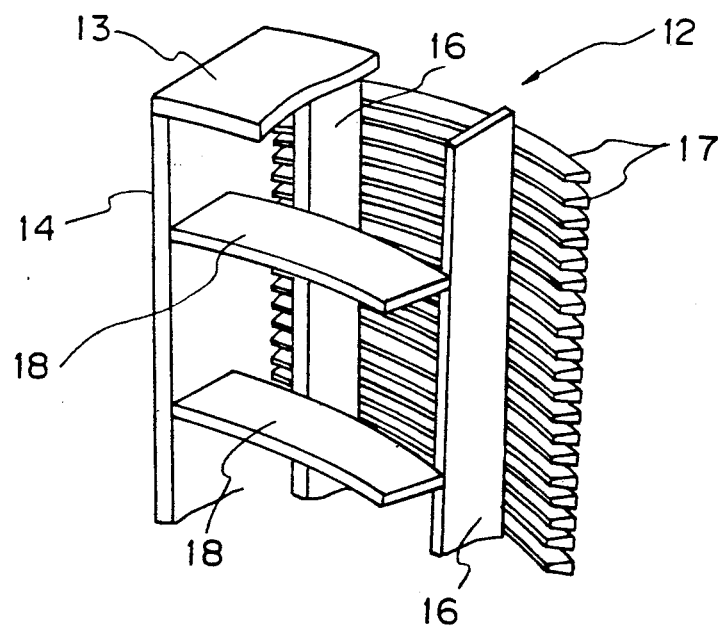
Figure 3:
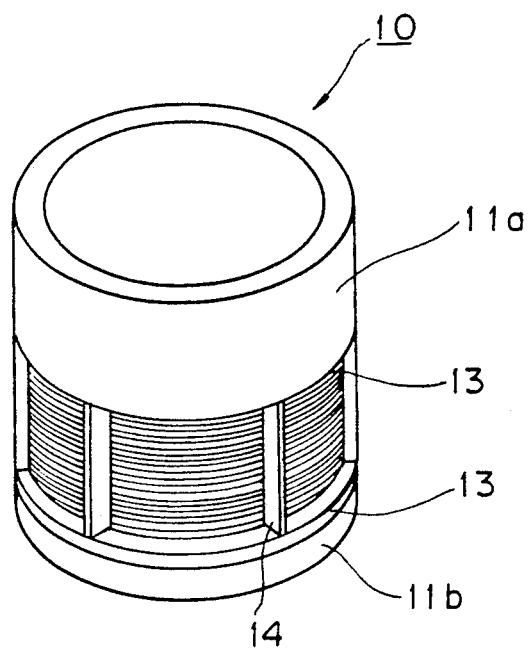

The water intake segment 12 shown in FIG. 2 has a form which is a segment of a hypothetical cylinder having a diameter corresponding to that of the well curb 11. The water intake segment 12 has a frame which is made of a vertically arranged pair of flanges 13, 13 extending in the circumferential direction of the hypothetical cylinder and a laterally arranged pair of flanges 14, 14 extending in the axial direction of the hypothetical cylinder. In the embodiment illustrated, the water intake segments 12 are connected at their laterally arranged flanges 13 to adjacent water intake segments 12 by welding or by means of suitable fastening means such as bolts and nuts to form a cylinder and two cylinders thus formed are superposed one upon the other and connected together at the flanges 13 extending in the circumferential direction to form the water intake portion 15 of the well structure.

Wire supporting rods 16 are welded at the ends thereof to the flanges 13, 13 and extend in parallel at a predetermined interval therebetween in the axial direction. Wires 17 of a triangular cross section are welded at the ends thereof to the flanges 14, 14 and extend in parallel at a predetermined interval therebetween in the circumferential direction. The wires 17 are welded to the wire supporting rods 16 at each point of contact between the wires 17 and the wire supporting rods 16. The wire supporting rods 16 function to support the wires 17 and also reinforce the frame. The wires 17 and the wire supporting rods 16 constitute the screen element of the water intake segment 12.

A plurality of arcuate reinforcing members 18 are provided inside of the wire supporting rods 16 and secured at the ends thereof to the flanges 14, 14 and extend in parallel at a predetermined interval therebetween in the circumferential direction. The reinforcing members 18 are welded to the wire supporting rods 16 at all points of contacts between the reinforcing members 18 and the wire supporting rods 16. Thus, the reinforcing members 18 and the wire supporting rods 16 cooperate with each other to reinforce the frame of the water intake segment 12.

In the water intake portion 15 of the well structure 10 of FIG. 1, the upper cylinder of the segments 12 is offset at the position of the flanges 14 from the lower cylinder of the segments 12. The positions of the flanges 14 of the upper and lower cylinders however may be registered with each other.

In a case where this water intake portion 15 is used for a relatively shallow well, the lower well curb 11b of the well curb 11 made of concrete is laid on the bottom of a pit formed in the ground 2. The water intake segments 12 are cylindrically arranged with their flanges 13 being connected to the flanges 13 of the adjacent water intake segments 12 and their flanges 14 being connected to the opposite flanges 14 of the vertically arranged water intake segments 12 thereby to form the water intake portion 15. The upper well curb 11a made of concrete and having a larger axial length than the lower well curb 11b is placed on the water intake portion 15 whereby the well structure 10 is completed.

Figure 4:
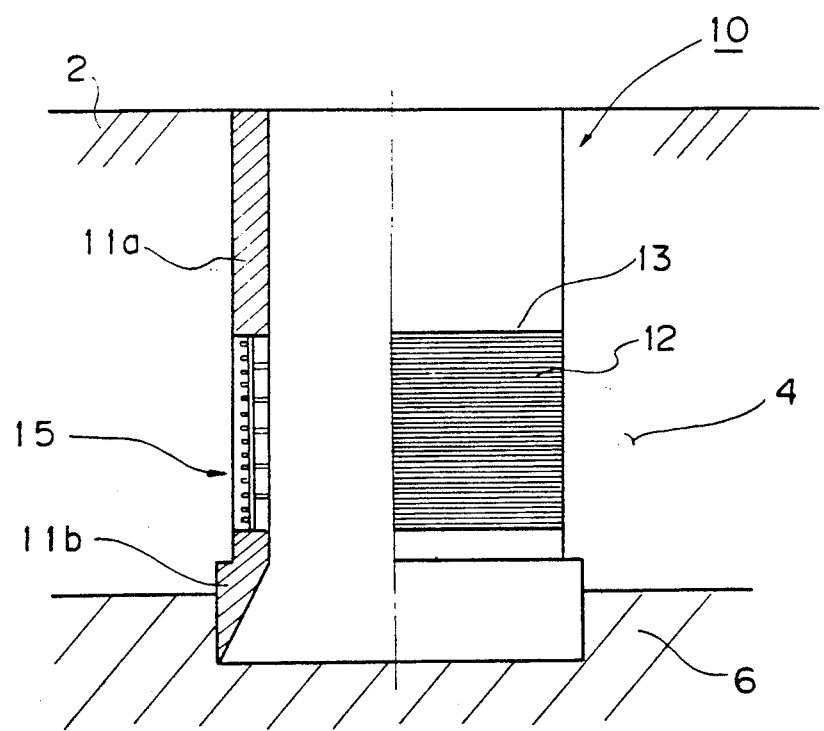
Figure 7:
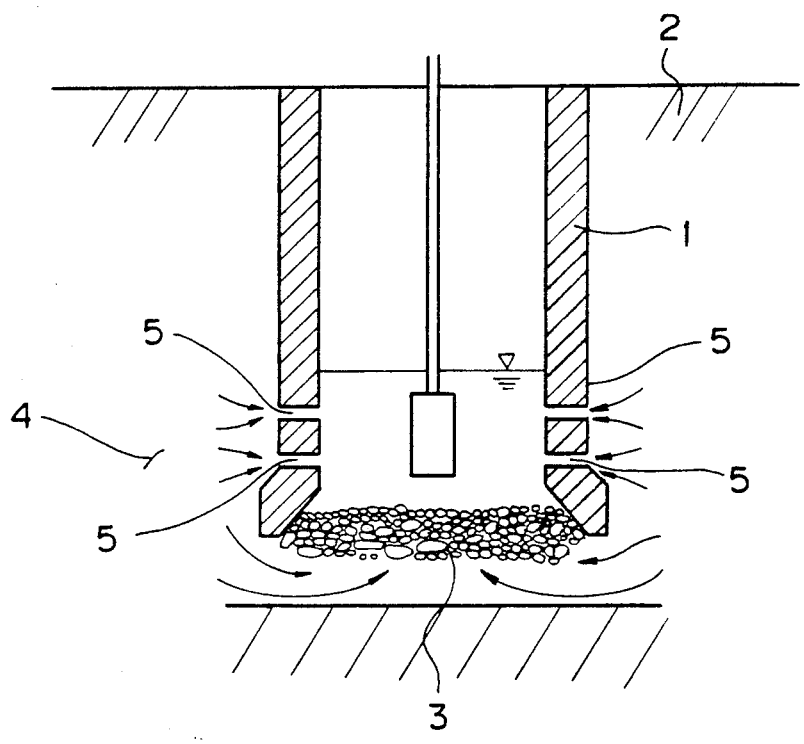
FIG. 7 is a sectional view of a prior art shallow well.

The well structure 10 may be situated in the same manner as in the prior art shallow well shown in FIG. 7, so that the lower end of the well structure 10 is located at the layer 4 where water is gathered which layer 4 is higher than the layer 6 which is impervious to water and water is collected from both the water intake portion 15 and the bottom of the well structure 10. Alternatively, the well structure 10 may be situated in such a manner that, as shown in FIG. 4, the lower end of the well structure 10 reaches the layer 6 and water is collected from the water intake portion 15 only.

In the well structure 10, since the water intake segments 12 has the frame made of the flanges 13 and 14 and reinforced with the reinforcing members 18, they have a sufficient strength against the axially acting force so that the water intake portion 15 is safe from collapse, though the upper well curb 11a having a large weight is placed thereon.

Even in a case where the well structure 10 is buried in a relatively shallow position underground, a large pressure by earth is applied because the well structure 10 has a large diameter. There is also a case where a large pressure is applied in the radial direction when the well curb 11 is inclined in lowering the well structure from the suspended state. In these cases also, a sufficient strength for resisting deformation can be obtained by the water intake portion 15 of the above construction.

Further, since the screen element is composed of the wires 17 and the wire supporting rods 16, a much larger opening rate can be obtained and flowing of sand into the well curb can be prevented as compared with the prior art well structure in which holes are formed in the concrete wall of the well curb for collecting water.

Figure 5:
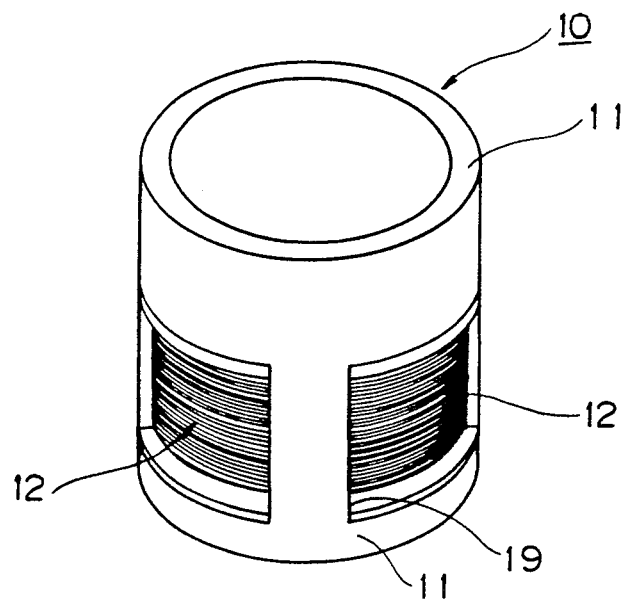
Figure 6:
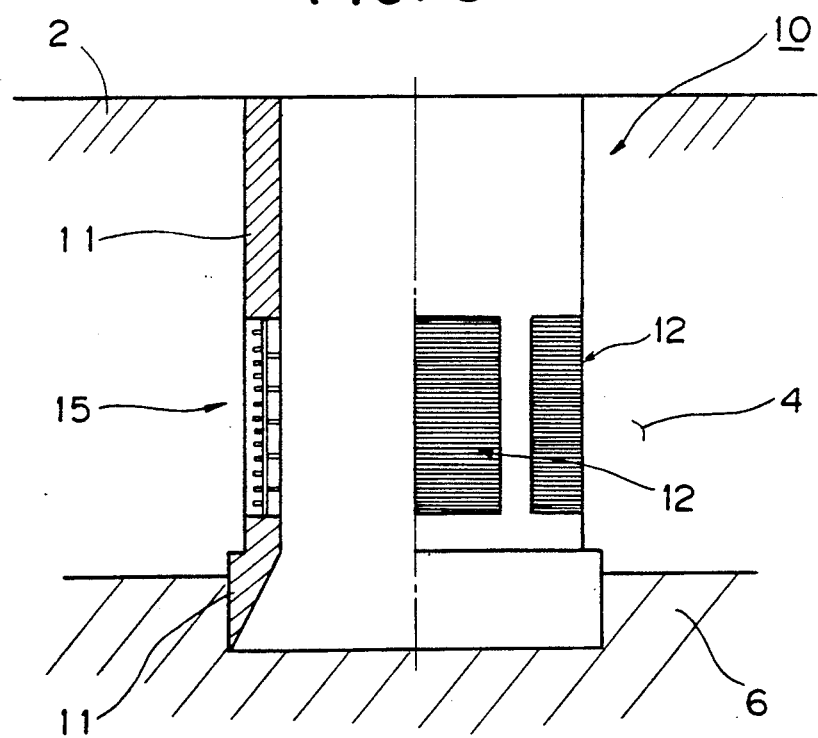

Another embodiment of the invention will be described with reference to FIGS. 5 and 6.

In this embodiment, the water intake segments 12 are mounted to windows formed in the well curb 11 instead of being connected to each other to form a cylinder.

The well curb 11 is formed with windows 19 in the lower portion thereof and the flanges 13 and 14 of the water intake segments 12 are secured to the horizontal edges and vertical edges of these windows 19.

The well structure 10 of this embodiment has an even larger buckling strength and has a larger opening rate and hence a larger water collecting ability than the prior art well structure.

In setting the well structure 10 by lowering it from the suspended state, the well curb 11 may be first lowered to a predetermined position and the water intake segments 12 may then be mounted to the windows 19 whereby damage to the wires 17 will be prevented.

Figure 8:
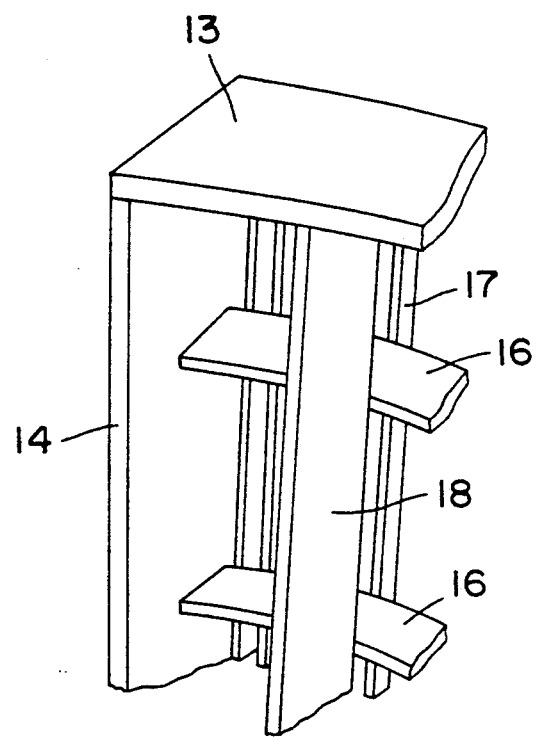
FIG. 8 is a view similar to that of FIG. 2 showing an alternative embodiment.

In the above described embodiments, the wires 17 are arranged in the circumferential direction. Alternatively, the wires 17 may be arranged in the axial direction and the wire supporting rods 16 may be arranged in the circumeferential direction as shown in FIG. 8.

The wires 17 are not limited to those having a triangular cross section but wires of other cross section such as a rectangular or round cross section may also be used.

What is claimed is:
1. A well structure comprising:
a) a well curb; and
b) one or more water intake segments mounted in a part of the well curb, each intake segment comprising:
a frame comprising a vertically spaced apart pair of flanges extending in the circumferential direction and a laterally spaced apart pair of flanges extending in the axial direction, said frame having a form which constitutes at least a substantially arcuate segment of a cylinder, a screen element comprising wire supporting rods extending in the axial direction and secured at the ends thereof to said pair of flanges extending in the circumferential direction, and wires extending in parallel at a predetermined interval therebetween in the circumferential direction and secured at the ends thereof to said pair of flanges extending in the axial direction, and one or more reinforcing members secured at ends thereof to the laterally spaced apart pair of flanges for reinforcing the frame.

2. A well structure comprising:
a) a well curb;
b) one or more water intake segments mounted in a part of the well curb, each intake segment comprising:

a frame comprising a vertically spaced apart pair of flanges extending in the circumferential direction and a laterally spaced apart pair of flanges extending in the axial direction, said frame having a form which constitutes at least a substantially arcuate segment of a cylinder, a screen element comprising wire supporting rods extending in the circumferential direction and secured at the ends thereof to said pair of flanges extending in the axial direction, and wires extending in parallel at a predetermined interval therebetween in the axial direction and secured at the ends thereof to said pair of flanges extending in the circumferential direction, and one or more reinforcing members secured at ends thereof to the vertically spaced apart pair of flanges for reinforcing the frame.

* * * * *